No. 860,004.
PATENTED JULY 16, 1907.
J. E. WINDLE.
CLOTH MEASURING MACHINE.
APPLICATION FILED SEPT. 22, 1905.
4 SHEETS—SHEET 3.
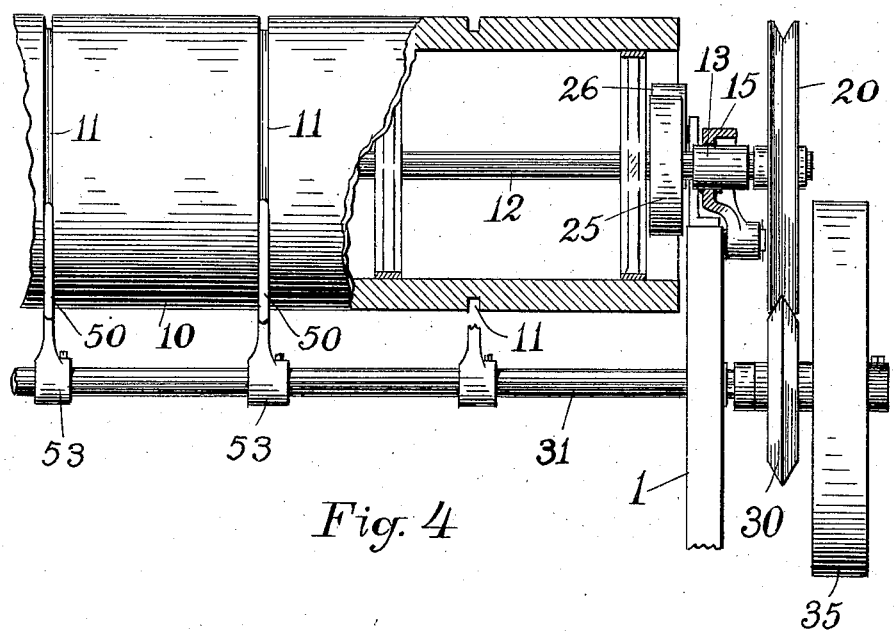
Fig. 4
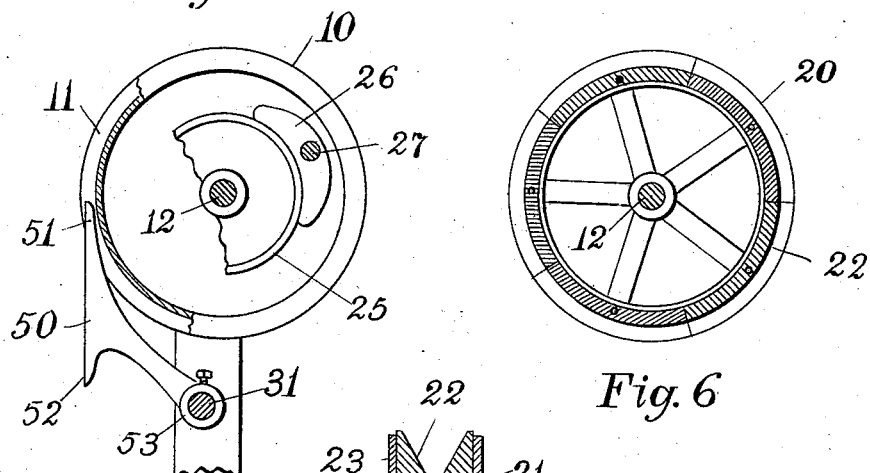
Fig. 5
Fig. 6
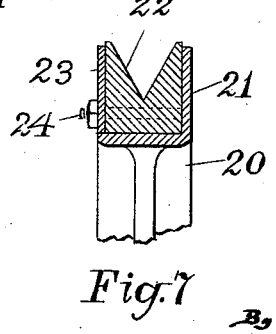
Fig. 7
Attest;
M. W. Upham.
E. W. Waite
Inventor,
John E. Windle;
By A. B. Upham,
His Atty.

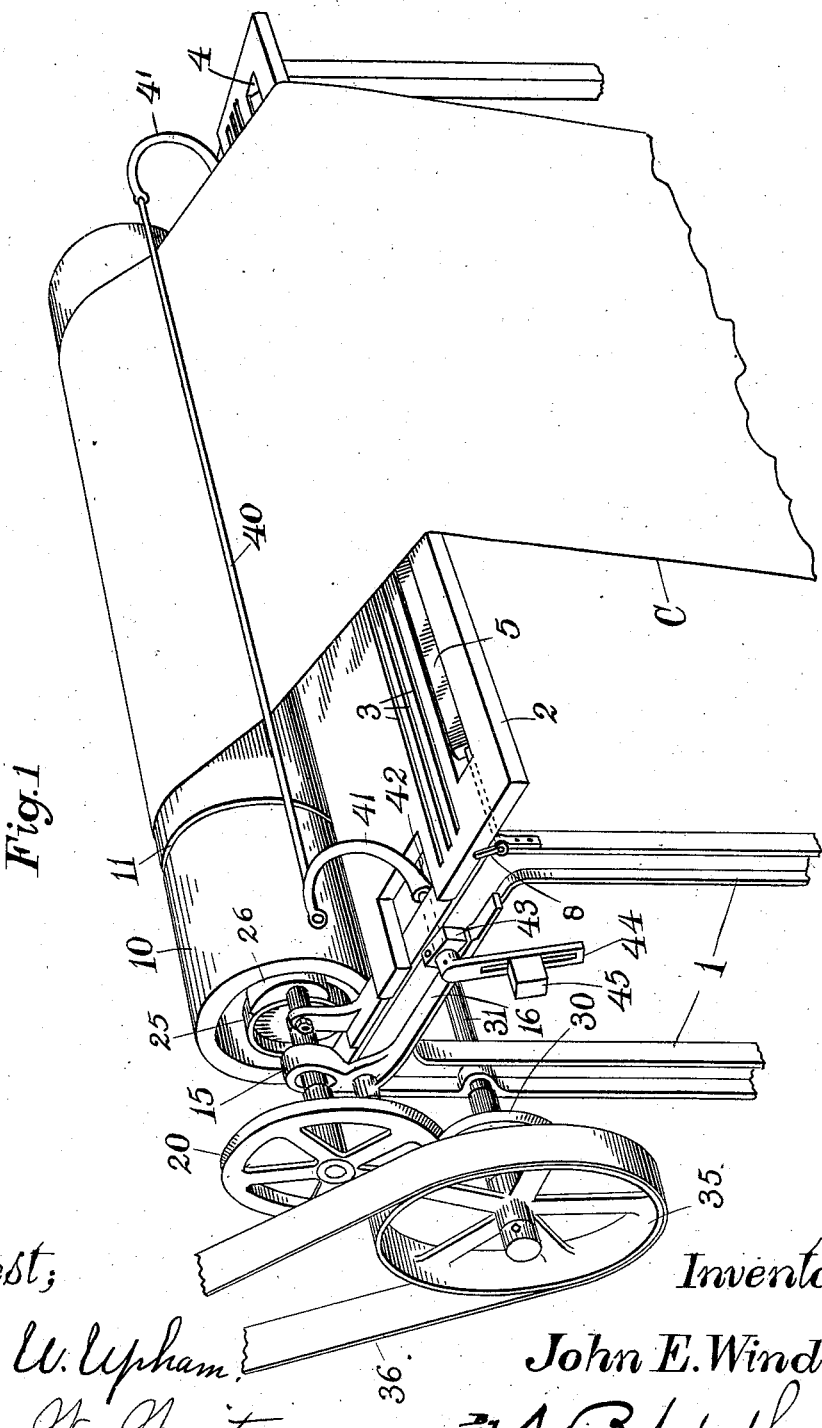

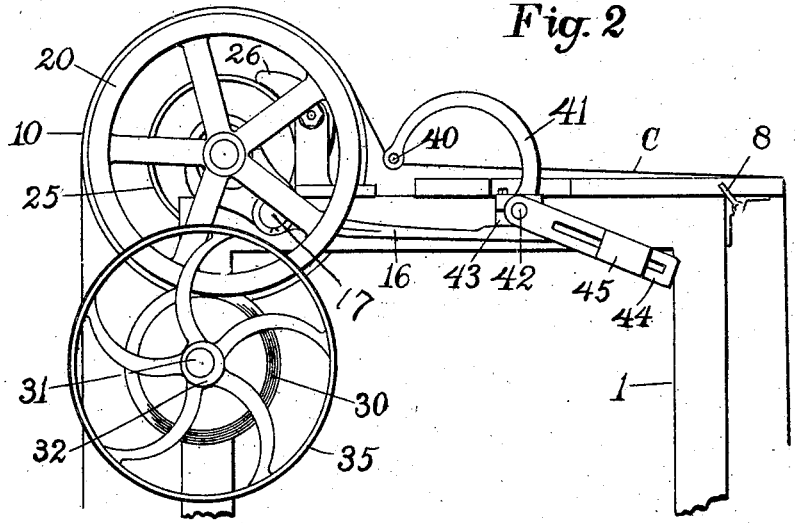
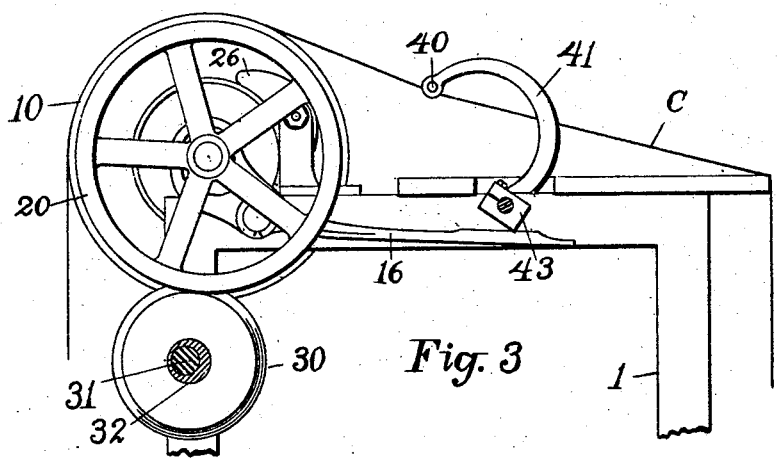
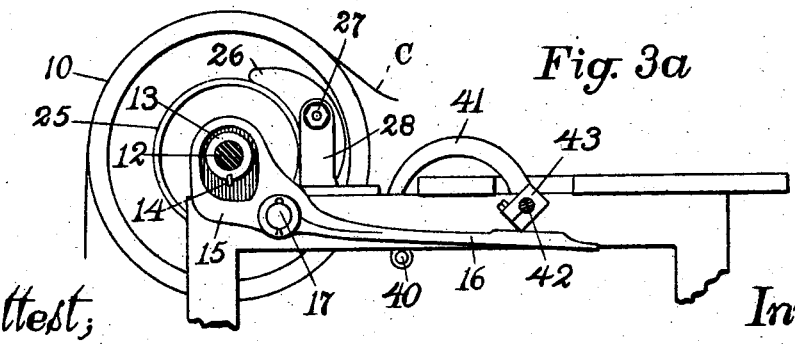

No. 860,004. PATENTED JULY 16, 1907.
J. E. WINDLE.
CLOTH MEASURING MACHINE.
APPLICATION FILED SEPT. 22, 1905.
4 SHEETS—SHEET 4.
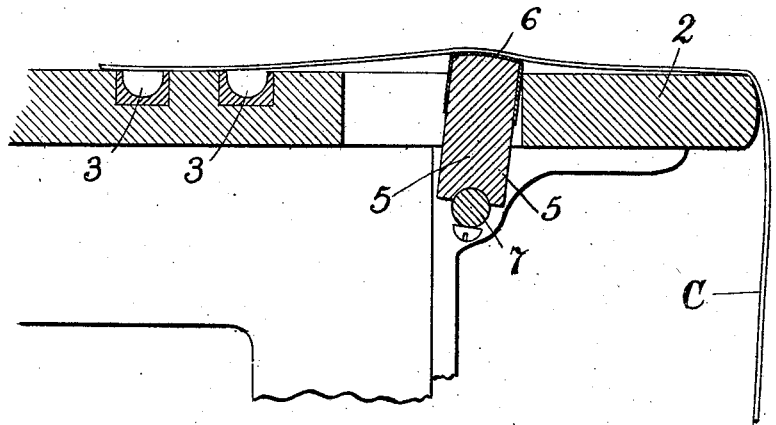
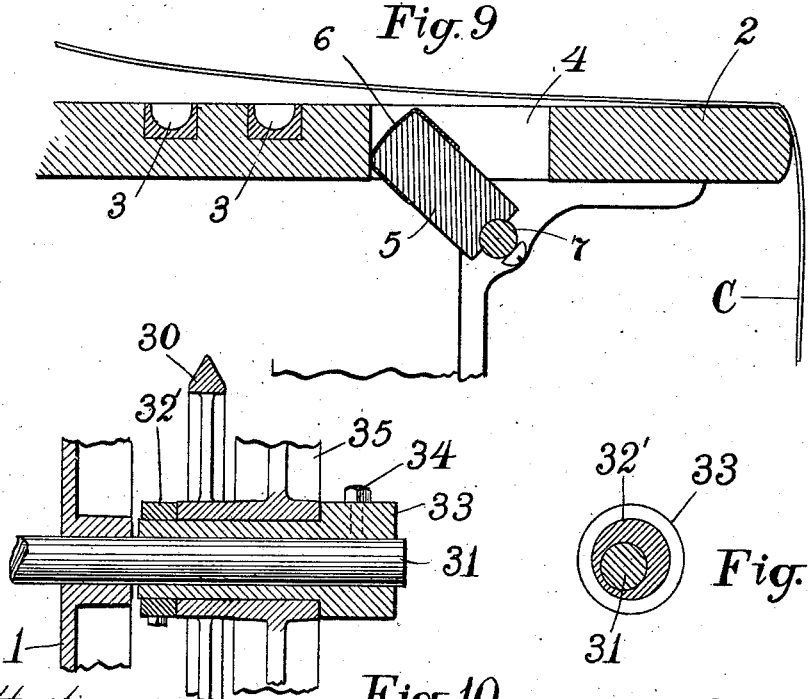
Attest:
M. W. Upham
E. H. Waite
Inventor,
John E. Windle,
By A. B. Upham,
His Atty.

UNITED STATES PATENT OFFICE.

JOHN E. WINDLE, OF WORCESTER, MASSACHUSETTS.

CLOTH-MEASURING MACHINE.

No. 860,004.      Specification of Letters Patent.      Patented July 16, 1907.

Application filed September 22, 1905. Serial No. 279,677.

To all whom it may concern:

Be it known that I, JOHN E. WINDLE, a citizen of the United States, and a resident of Worcester, in the county of Worcester, Commonwealth of Massachusetts, have invented certain new and useful Improvements in Cloth-Measuring Machines, of which the following is a full, clear, and exact description.

The object of this invention is the construction of an improved machine for measuring cloth, ribbon, paper, thin sheet metal, netting, rope, wire, and other elongated flexible material; and the particular improvements which I effect relate to the stopping and starting devices for the measuring cylinder; to a retaining device whereby the fabric is held while being trimmed preparatory to being measured; and to the details of construction hereinafter set forth.

Referring to the drawings forming part of this specification, Figure 1 is a perspective view of a measuring machine embodying my invention. Fig. 2 is a side elevation of the same, showing the fabric in its usual position while being measured. Fig. 3 is a similar elevation with certain wheels removed, and showing the stopping mechanism as operated by an increase in tension upon the fabric. Fig. 3ª is a similar elevation but with certain other parts removed, and showing the stopping mechanism as operated by the arrival of the termination of the fabric. Fig. 4 is a rear elevation of a part of the machine, portions thereof in section. Fig. 5 is an end view of the measuring cylinder, partly in section. Fig. 6 is a sectional view of the driven clutch-wheel. Fig. 7 is a cross section of the rim of said clutch-wheel, on a larger scale. Fig. 8 is a side sectional view nearly full size of the retaining device. Fig. 9 is a similar view showing said device inoperative. Fig. 10 is a detail section of the adjustable spindle for the driving clutch-wheel seen from the rear. Fig. 11 is a cross section of the same.

The main parts of the machine comprise a suitable frame 1, table 2, measuring cylinder 10, clutch wheels 20, 30, driving wheel 35, and rider 40 normally supported by the fabric being measured.

The driving wheel or pulley 35, receiving power from any suitable source, through any means as the belt 36, is loosely mounted on the fixed spindle 31 held by said frame, and is rigidly connected with the driving clutch-wheel 30. By preference the latter is formed with an acute periphery entering the correspondingly grooved periphery of the driven clutch-wheel 20, which is fixed upon the shaft 12 of the measuring drum or cylinder. To engage and disengage said clutch-wheels, said shaft 12 is supported by the lever 16 pivoted upon the stud 17 projecting from the frame 1. By depressing the long arm of said lever, its shorter arm 15 raises the end of the shaft 12 carrying the clutch-wheel 20 out of contact with the other clutch-wheel, and so permits the drum or cylinder 10 to stop. By releasing said lever, the weight of said cylinder presses the clutch-wheel 20 into sufficiently tight contact with the clutch-wheel 30 to cause the latter to rotate the former wheel and thereby the said cylinder.

What appears in Fig. 3 to be the opening for the shaft 12 in the short arm of the lever 16, is in reality the end view of the cylindrical bearing 13 held in a loose opening of substantially equal diameter formed in said short arm; said bearing being prevented from rotating with the shaft by a key 14. See Fig. 4. Said cylinder being covered with any suitable friction-engendering material, as emery-paper, and connected with any tally for recording its rotations, a fabric C, one extremity of which is laid thereon, is steadily fed along thereby until its other end is reached, when the machine automatically stops by the operation of the rider 40. Said rider consists preferably of a rod extending transversely of the fabric C and substantially parallel with the cylinder 10, and terminally held by the arms 41 fixed upon the shaft 42. These arms are curved as shown to permit their free ends, and hence said rod, to swing down between the rear edge of the table 2 and the cylinder 10; this descent occurring whenever there is no fabric supporting said rod. On the outer end of said shaft 42 is a cam-block 43 disposed to present its flat face to the lever 16 when the rod 40 is supported by a fabric being measured. Should, now, the fabric fail to thus support said rod, as by the arrival thereto of the extremity of the same, said rod sinks to its lowermost position; the corner of the cam-block 43 presses upon and depresses the long arm of the lever 16; the clutch-wheels are disengaged, and the cylinder 10 ceases to turn.

While this is not the first measuring machine to stop upon the arrival of the termination of the cloth, the method by which I accomplish the result is entirely new and permits of obtaining other novel features. The first of these is an automatic lock for instantly stopping the motion of the cylinder as soon as the driven clutch-wheel rises. While simply ceasing to positively rotate said cylinder will soon terminate its motion, yet if the machine is run at a good rate of speed, as is necessary in order to render the work economical, when the end of the cloth reaches the table-edge and the rod or rider 40 falls, the cylinder will continue to turn for an appreciable but varying length of time, depending upon the weight of the fabric and its consequent pull at the rear of the machine. Such automatic stop or lock consists of a brake-shoe 26 held just out of normal contact with the wheel or pulley 25 fixed on the shaft of said cylinder. Hence, when said shaft rises upon the disengagement of the driven clutch-wheel with the other, said wheel or pulley 25 is pressed against said brake-shoe and further rotation of said shaft and cylinder immediately stopped. As shown in Figs. 3 and 3ª, said brake-shoe is loosely mounted on the spindle 27 rigidly projecting from the post 28 bolted to the machine-frame. Another function accomplished by means of this rider is that of similarly stopping the machine whenever through any means the cloth fails to come to the measuring cylinder with its normal freedom. This may occur whenever the cloth fails to unfold evenly from the pile in which it may have been laid at the front of the machine; as would occur if a part of the cloth should be at the bottom of the folds. The cloth being thus caught or retarded, while the machine turns steadily on, it will, if at all yielding, be thereby stretched and the measuring operation rendered imperfect and the tally inaccurate. By means of the arrangement aforesaid, the instant the fabric is thus caught or retarded, the slack normally in the stretch thereof between the cylinder 10 and the table-edge as shown in Fig. 2, is immediately taken up as shown in Fig. 3, and the rod 40 raised in position. This new position turns the cam-block 43 to present a corner to the lever 16 and thereby depress the latter and stop the measuring cylinder in the manner already described.

Another advantage obtained by means of the rider 40 is that of delivering the fabric to the measuring cylinder with greater uniformity of tension, and so aiding in the accuracy of the machine. This is done by the weight and friction of the rod upon the cloth. If the cloth rises too freely to the table-edge, a slightly greater slack will be created between said edge and the cylinder, causing the rod 40 to descend somewhat; and said rod being brought thereby farther away from the vertical plane cutting its supporting shaft 42, will be less sustained by said shaft and will accordingly put increased pressure upon the fabric. On the other hand, a slight increased resistance to the fabric will raise the rod somewhat and correspondingly decrease its pressure thereon. In this way said rod preserves a substantially uniform tension upon the cloth, and at the same time serves to stop the machine the instant the tension diminishes or increases beyond certain limits.

There is, of course, more or less wear between the clutch-surfaces, and as it is necessary to preserve a constant distance through which the shaft 12 is shifted to free the wheels 20 and 30, and bring the pulley 25 against the brake-shoe 26, the driving clutch-wheel 30 is provided with the adjusting device consisting of the eccentric sleeve 32 normally fixed on the spindle 31 by means of a set-screw 34 (see Figs. 10 and 11); upon which sleeve the said wheel 30 and the driving wheel 35 freely turn. By unloosening said set screw and slightly turning said sleeve, the axial center of the said wheels is raised to take up any wear which may have occurred. Said sleeve is provided with a head 33, preferably milled for more easy operation, between which head and a collar 32' said wheels are confined.

The most secure and constant engagement between the clutch-wheels 20, 30 is obtained by forming the grooved member with a wooden face or rim, as shown in Figs. 6 and 7. The wheel 20 is for this purpose formed with a flange 21 and a removable annular plate 23 between which the wooden rim 22 is clamped by suitable bolts 24; the wooden rim being preferably in sections presenting the grain radially. When too much worn, new blocks can be substituted.

I prefer to provide the shaft 42 of the rider 40 with a counterweighted arm for partially counterbalancing said rider and its arms. To better adapt the same to different weights of fabric being measured, such arm 44 has its weight 45 mounted adjustably thereon, as indicated by the slot shown in Fig. 1, through which is designed to pass the bolt or bolts by which said weight is fastened to said arm.

Inasmuch as the shaft 12 of the measuring cylinder 10 is given an angular movement when its clutch-wheel 20 is raised and lowered, I prefer to give its bearing 13 a loose support in the arm 15 of the lever 16, as shown in Fig. 4, but to keep such bearing from turning, by means of a key 14 shown in Fig. 3ª.

In preparing a length of cloth for the measuring machine, it is customary to lay the initial end thereof upon the table 2, and to trim off the uneven extremity thereof by running a pair of shears along a groove 3 provided therefor in the surface of the table. The great difficulty in this operation has been the retention of the cloth in position while being thus trimmed; the weight of the pendent part of the fabric tending to drag the same off the table, not only during the operation itself, but even more while the operator is endeavoring to lay the cloth-end evenly upon the trimming-groove. The attempt has been made to remedy this defect by securing a strip of tape or other retarding material along the edge of the table; but during the operation of measuring, this retarded the fabric and also was itself rapidly worn away. I have wholly overcome this serious defect by forming a slot 4 in the table between its edge and the groove or grooves 3, and locating a rocking bar 5 in this groove. When rocked to its vertical position, one edge of this bar comes above the surface of the table, as shown in Fig. 8; but when tipped to one side as shown in Fig. 9, this edge wholly disappears below such top-surface. This edge of said bar I cover with any suitable retarding material, as sand-paper, emery cloth, cloth, or even metal points, for the purpose of holding the cloth C in place during the trimming operation, as shown in Fig. 8. As soon, however, as the measuring operation is begun, the pull of the cloth immediately rocks the bar 5 over to its lowermost position, thereby causing its retarding surface 6 to sink below the table-top and so cease affecting the cloth.

Previous to my invention it has been customary to locate one grooved rod 3 upon the top of the table for guiding the trimming-shears, but I have improved thereon by increasing the number of such grooved rods to two or three, as shown in Figs. 1 and 8, and also by sinking the same below the upper surface of the table, as shown in Figs. 8 and 9, both for the sake of neatness in appearance and to obviate any possible wear between them and the cloth being dragged over them.

Another important improvement which I have effected in connection with the measuring cylinder is that whereby it is positively freed from the fabric descending therefrom. There is always danger of the initial end of the cloth's adhering to the cylinder as it comes over and down therewith, and being in this manner wound about the cylinder; necessitating, in case the same were not immediately observed, considerable bother and delay in unwinding the cloth from the cylinder. I have overcome this defect by forming the cylinder 10 with several annular grooves, shown in Figs. 1, 4 and 5, in each of which is located a finger 50 descending tangentially from close wtihin the surface of the cylinder. Each such finger has its upper end 51 wholly within the groove, and is supported at an intermediate point in order to present its lower extremity as a sharp end 52. Were the lower ends of these fingers simply a bend back to their support, there would be danger of the descending cloth's following the latter instead of continuing directly down to the floor or other place for the cloth's reception. These fingers 50 are held by means of their sleeves 53 secured upon the fixed spindle 31 extended to the other side of the machine.

The operation of this machine, is, in brief, as follows: A bolt of cloth is laid upon the floor, or other suitable support, directly beneath the front edge of the table; and an end of the fabric drawn up and placed upon the front portion of such table, the retarding device 5 retaining such fabric from falling to the floor while the operator is trimming off the edge of the fabric. Then the operator drags the end of the cloth along to the measuring cylinder, passing it beneath the rider or rod 40, and gives a partial turn to the cylinder. This puts a tension upon the section of cloth between the said cylinder and table-edge sufficient to elevate the rider and automatically set the machine into operation; after which the operator can leave it and attend to other work. The machine now takes care of itself until the entire bolt of cloth has been unwound, or unfolded, from beneath the table's front edge, and transferred to a suitable support beneath the rear of the machine; every rotation of the cylinder in performing this task being recorded by a suitable tally, and the exact length of the cloth thereby shown. When the extremity of the cloth has been thus brought to the machine, the consequent diminution in tension thereon permits the rider to sink, and the machine to be automatically stopped. In case the unfolding cloth becomes in any way caught, the increase in tension upon that section between the table-edge and cylinder, acts to elevate the rider and so stop the machine. The machine being thus seen to be stationary, the attendant comes to rearrange the folds of cloth, and so permit it again to continue its operation; while if the stop is caused by the completion of the measuring of one bolt, another is supplied and the work continued. While this economy in operating expense is a most important feature, an equally valuable one is the measuring-accuracy which is given by the automatic stopping function of the machine. First, it is practically impossible for an attendant to stop a measuring machine by hand at the proper instant when the last extremity of the cloth reaches the table. Sometimes he will stop it an instant too soon; or, an instant too late. Hence the accuracy of the machine is impaired to a considerable extent. I do not, of course, claim to be the first one to have accomplished this function of having the machine stop automatically upon the arrival of the cloth's end; but I do consider that I am the first to build a machine which automatically stops when the tension on the cloth is unduly increased, and of course the first to build one which stops automatically for either an increase or a diminution in the tension. The importance of this automatic stop upon an increase in tension is very great, not only because of the stopping of the machine at such time, and the consequent avoidance of the inaccuracy of measuring a stretched length of cloth; but on account of the possibility given by the construction above described of the measuring cylinder's slowing up somewhat, even when not wholly stopping, by a slighter increase in tension, and the accuracy of its operation further assured. This temporary slowing down is permitted by the friction engagement between the drive-wheel and the driven-wheel. When the rider rises to a lesser extent than enough to entirely disengage the two wheels, the pressure between them can be so diminished as to permit the driven-wheel to slip somewhat, and the cylinder to accordingly turn less rapidly. This may relieve the temporary retardation of the cloth without wholly stopping the motion of the machine; and then the latter go on as before. This still further prevents any stretching of the fabric, and increases the accuracy of the measurements accordingly.

What I claim as my invention and for which I desire Letters Patent is as follows, to wit:—

1. The combination with mechanism for longitudinally moving an elongated flexible material, of a rider resting upon a tensioned length of said material, and connections between said rider and mechanism whereby an increase in tensional strain on said material acts to elevate said rider and moderate the speed of said mechanism.

2. The combination with mechanism for longitudinally moving an elongated flexible material, of a stopping device operated by said material to stop said mechanism when the tension upon said material varies beyond certain opposite specified limits.

3. The combination with mechanism for longitudinally moving an elongated flexible material, of a rod extending from side to side upon a tensioned length of said material, and a stopping device for said mechanism operated by said rod.

4. The combination with a driving means, and mechanism for longitudinally moving an elongated flexible material, of means automatically operated by the said material to simultaneously disengage said mechanism and driving means, and brake said mechanism.

5. The combination with a driving means, and mechanism for longitudinally moving an elongated flexible material, of devices operated by variations in tension on said material to simultaneously disengage said driving means and mechanism, and to brake the latter.

6. The combination with a cylinder disposed for longitudinally moving an elongated flexible material, of a driven clutch-wheel connected with said cylinder, a driving clutch-wheel peripherally engaging and supporting the first-named wheel, and means actuated by substantial variations in tension on said material to raise the first-named wheel out of engagement with the other.

7. The combination with a cylinder disposed for longitudinally moving an elongated flexible material, of a driven clutch-wheel connected with said cylinder, a driving clutch-wheel peripherally engaging the first-named wheel, means actuated by substantial variations in tension on said material to raise the first-named clutch-wheel out of engagement with the other, and a braking device disposed to retard said cylinder when said clutch-wheel is thus raised.

8. The combination with a cylinder disposed for longitudinally moving an elongated flexible material, of a driven clutch-wheel connected with said cylinder, a driving clutch-wheel peripherally engaging the first-named wheel, means actuated by variations in tension of said material to raise the first-named wheel out of engagement with the other, and a fixed brake-shoe met by a surface connected with said cylinder when the first-named wheel is raised.

9. The combination with a shaft and a cylinder disposed for longitudinally moving an elongated flexible material, of a clutch-wheel fixed on said shaft, a bearing for said shaft near said wheel, a lever supporting said bearing, a driving clutch-wheel normally engaging the first-named wheel, a rider supported on a tensioned length of said material, and means whereby the variations in position of said rider raises and lowers said lever and thereby moves the clutch-wheels out of and into mutual engagement.

10. The combination with a shaft and a cylinder disposed for longitudinally moving an elongated flexible material, of a clutch-wheel fixed on said shaft, a pulley or wheel fixed on said shaft, a bearing for said shaft near said clutch-wheel, a lever supporting said bearing, a driving clutch-wheel normally engaging the first named clutch-wheel, a fixed brake-shoe located close above the periphery of said pulley or wheel, and means for depressing said lever and thereby disengaging said clutch-wheels and pressing said pulley or wheel into contact with said brake-shoe.

11. A measuring cylinder having a clutch-wheel connected therewith, in combination with a pivoted lever supporting the same, a driving clutch-wheel normally engaging the first-named clutch-wheel, a shaft having a cam thereon engaging said lever, arms fixed to said shaft, and a rod joining the free ends of said arms and supported by the material being measured.

12. A measuring cylinder having a clutch-wheel connected therewith, in combination with a pivoted lever supporting the same, a driving clutch-wheel normally engaging the first-named clutch-wheel, a shaft having a cam thereon engaging said lever, arms fixed to said shaft, a rod joining the free ends of said arms and supported by the material being measured, and a counterweighted arm rigid with said shaft.

13. In a cloth measuring machine, the combination with the measuring cylinder formed with a plurality of annular grooves, of a fixed rod below said cylinder, and a plurality of fingers held by said rod, each with its upper end entering one of said grooves tangentially and its lower end terminating sharply the outer face being substantially vertical.

14. The combination with a table having a slot therein near one edge thereof, of a bar located in said slot and supported on terminal trunnions; a longitudinal face of said bar being disposed to rise above the surface of said table when the bar is rocked in one direction and to sink below when oppositely rocked, and said face being made capable of engaging a cloth laid thereon and resisting a dragging motion applied thereto in one direction.

15. The combination with a supporting table having one or more transverse trimming-grooves therein and a slot parallel with the latter and at a short distance therefrom, of a rocking bar located in said slot and having a part thereof which can be moved up above the top of said table said part being provided with a retarding surface.

In testimony that I claim the foregoing invention, I have hereunto set my hand this 11th day of September, 1905.

JOHN E. WINDLE.

Witnesses:
J. G. CRAIN,
A. B. UPHAM.